(12) United States Patent
Sills et al.

(10) Patent No.: US 8,217,557 B2
(45) Date of Patent: Jul. 10, 2012

(54) SOLID STATE LIGHTS WITH THERMOSIPHON LIQUID COOLING STRUCTURES AND METHODS

(75) Inventors: Scott E. Sills, Boise, ID (US); Anton J. de Villiers, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/872,647

(22) Filed: Aug. 31, 2010

(65) Prior Publication Data
US 2012/0049715 A1 Mar. 1, 2012

(51) Int. Cl.
*H01J 1/02* (2006.01)

(52) U.S. Cl. ............................ 313/12; 313/512; 313/484

(58) Field of Classification Search .......... 313/484–487, 313/489, 498, 512, 467, 468, 499, 501–503, 313/12, 35; 165/104.11, 104.33; 362/294, 362/272
See application file for complete search history.

(56) References Cited

U.S. PATENT DOCUMENTS

| | | | |
|---|---|---|---|
| 4,879,629 A | 11/1989 | Tustaniwskyj et al. | |
| 5,647,662 A * | 7/1997 | Ziegler et al. | 362/294 |
| 5,972,736 A * | 10/1999 | Malladi et al. | 438/118 |
| 5,978,220 A | 11/1999 | Frey et al. | |
| 6,690,696 B2 * | 2/2004 | Byren et al. | 372/35 |
| 7,304,418 B2 * | 12/2007 | Nagata et al. | 313/32 |
| 7,505,268 B2 | 3/2009 | Schick | |
| 2004/0004435 A1 | 1/2004 | Hsu | |
| 2004/0105264 A1 | 6/2004 | Spero | |
| 2005/0158687 A1 | 7/2005 | Dahm | |
| 2008/0013316 A1 | 1/2008 | Chiang | |
| 2008/0179622 A1 | 7/2008 | Herrmann | |
| 2008/0278954 A1 | 11/2008 | Speier | |
| 2009/0001372 A1 | 1/2009 | Arik et al. | |
| 2010/0001294 A1 * | 1/2010 | Faller et al. | 257/79 |
| 2010/0044746 A1 * | 2/2010 | Steenbruggen | 257/99 |

* cited by examiner

*Primary Examiner* — Peter Macchiarolo
(74) *Attorney, Agent, or Firm* — Perkins Coie LLP

(57) ABSTRACT

A solid state lighting (SSL) device with a solid state emitter (SSE) being partially exposed in a channel loop, and methods of making and using such SSLs. The SSE can have thermally conductive projections such as fins, posts, or other structures configured to transfer heat into a fluid medium, such as a liquid coolant in the channel loop. The channel loop can include an upward channel in which the SSE is exposed to warm the coolant in the upward channel, and a downward channel through which coolant moves after being cooled by a cooling structure. The coolant in the channel loop can naturally circulate due to the heat from the SSE.

34 Claims, 7 Drawing Sheets

US 8,217,557 B2

SOLID STATE LIGHTS WITH THERMOSIPHON LIQUID COOLING STRUCTURES AND METHODS

TECHNICAL FIELD

The present technology is related to solid state lighting (SSL) devices and associated methods of operation and manufacture. In particular, the present technology is related to cooling SSL devices with one or more solid state emitters (SSEs), such as light emitting diodes.

BACKGROUND

SSL devices and SSEs are increasingly in demand for many purposes because SSEs efficiently produce high-intensity, high-quality light. Mobile phones, personal digital assistants, digital cameras, MP3 players, and other portable devices use SSL devices for background illumination. Applications for SSL devices extend beyond portable electronic devices and include many types of lights, such as ceiling panels, desk lamps, refrigerator lights, table lamps, street lights, and automobile headlights.

There are several types of SSEs, such as semiconductor light-emitting diodes (LEDs), polymer light-emitting diodes (PLEDs), and organic light-emitting diodes (OLEDs). Generally, SSEs generate less heat, provide greater resistance to shock and vibration, and have longer life spans than conventional lighting devices that use filaments, plasma, or gas as sources of illumination (e.g., florescent tubes and incandescent light bulbs).

A conventional type of SSE is a "white light" LED. White light requires a mixture of wavelengths to be perceived as such by human eyes. However, LEDs typically only emit light at one particular wavelength (e.g., blue light), so LEDs must be modified to emulate white light. One conventional technique for doing so includes depositing a converter material (e.g., phosphor) on the LED. For example, as shown in FIG. 1A, a conventional SSL device 10 includes a support 2 carrying an LED 4 and a converter material 6 deposited on the LED 4. The LED 4 can include one or more light emitting components. FIG. 1B is a cross-sectional diagram of a portion of a conventional indium-gallium nitride LED 4. As shown in FIG. 1B, the LED 4 includes a substrate 12, an N-type gallium nitride (GaN) material 14, an indium gallium nitride (InGaN) material 16 (and/or GaN multiple quantum wells), and a P-type GaN material 18 on one another in series. Conventional substrates 12 are comprised of sapphire or silicon. The LED 4 can further include a first contact 20 on the P-type GaN material 18 and a second contact 22 on the N-type GaN material 14. Referring to both FIGS. 1A and 1B, the InGaN material 16 of the LED 4 emits a blue light that stimulates the converter material 6 to emit a light (e.g., a yellow light) at a desired frequency. The combination of the blue and yellow emissions appears white to human eyes if matched appropriately.

Although LEDs produce less heat than conventional lighting devices, LEDs can produce enough heat to increase the rate at which some of the heat sensitive semiconductor and optical components deteriorate. The converter material 6, for example, deteriorates relatively rapidly at higher temperatures, and over time the converter material 6 may emit light at a different frequency than the desired frequency. The combined emissions accordingly appear off-white and may reduce the color fidelity of electronic devices. The junctions in the semiconductor materials that produce the light also deteriorate at higher temperatures. Therefore, it would be desirable to improve the cooling in SSEs and/or SSL devices.

DETAILED DESCRIPTION

Various embodiments of solid state lights ("SSLs") and associated methods of manufacturing SSLs are described below. The term "SSL" generally refers to "solid state light" and/or "solid state lighting" according to the context in which it is used. The terms "SSL emitter" or "solid state emitter" ("SSE") generally refer to solid state components that convert electrical energy into electromagnetic radiation in the visible, ultraviolet, infrared and/or other spectra. SSEs include light-emitting diodes (LEDs), which are semiconductor diodes that convert electrical energy into electromagnetic radiation in a desired spectrum. SSEs can also include polymer light-emitting diodes (PLEDs) and organic light-emitting diodes (OLEDs). The term "phosphor" generally refers to a material that can continue emitting light after exposure to energy (e.g., electrons and/or photons). A person skilled in the relevant art will understand that the new technology may have additional embodiments and that the new technology may be practiced without several of the details of the embodiments described below with reference to FIGS. 2-6.

Figure 1A:
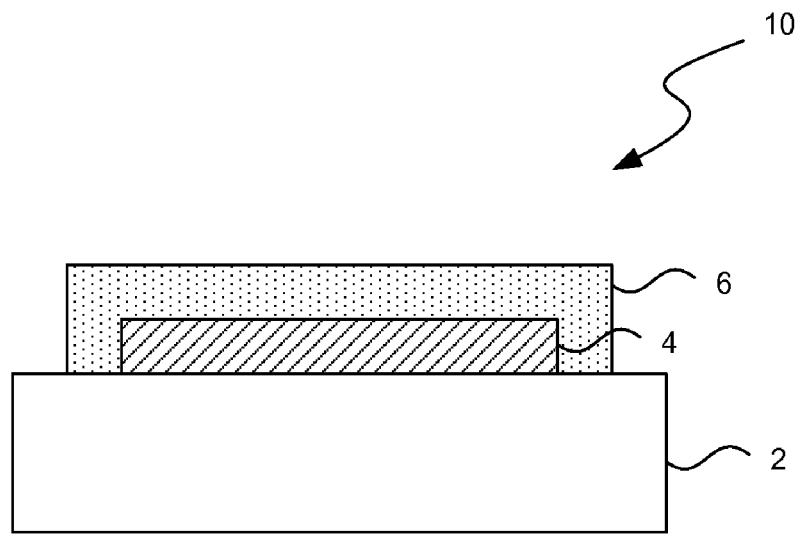
FIG. 1A is a partially schematic cross-sectional view of an SSL device in accordance with the prior art.
Figure 1B:
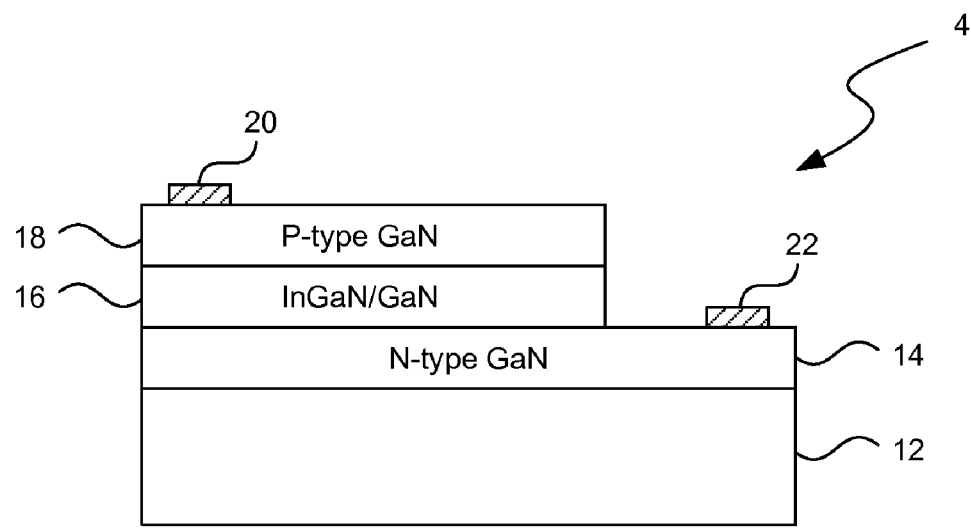
FIG. 1B is a partially schematic cross-sectional view of an LED in accordance with the prior art.
Figure 2:
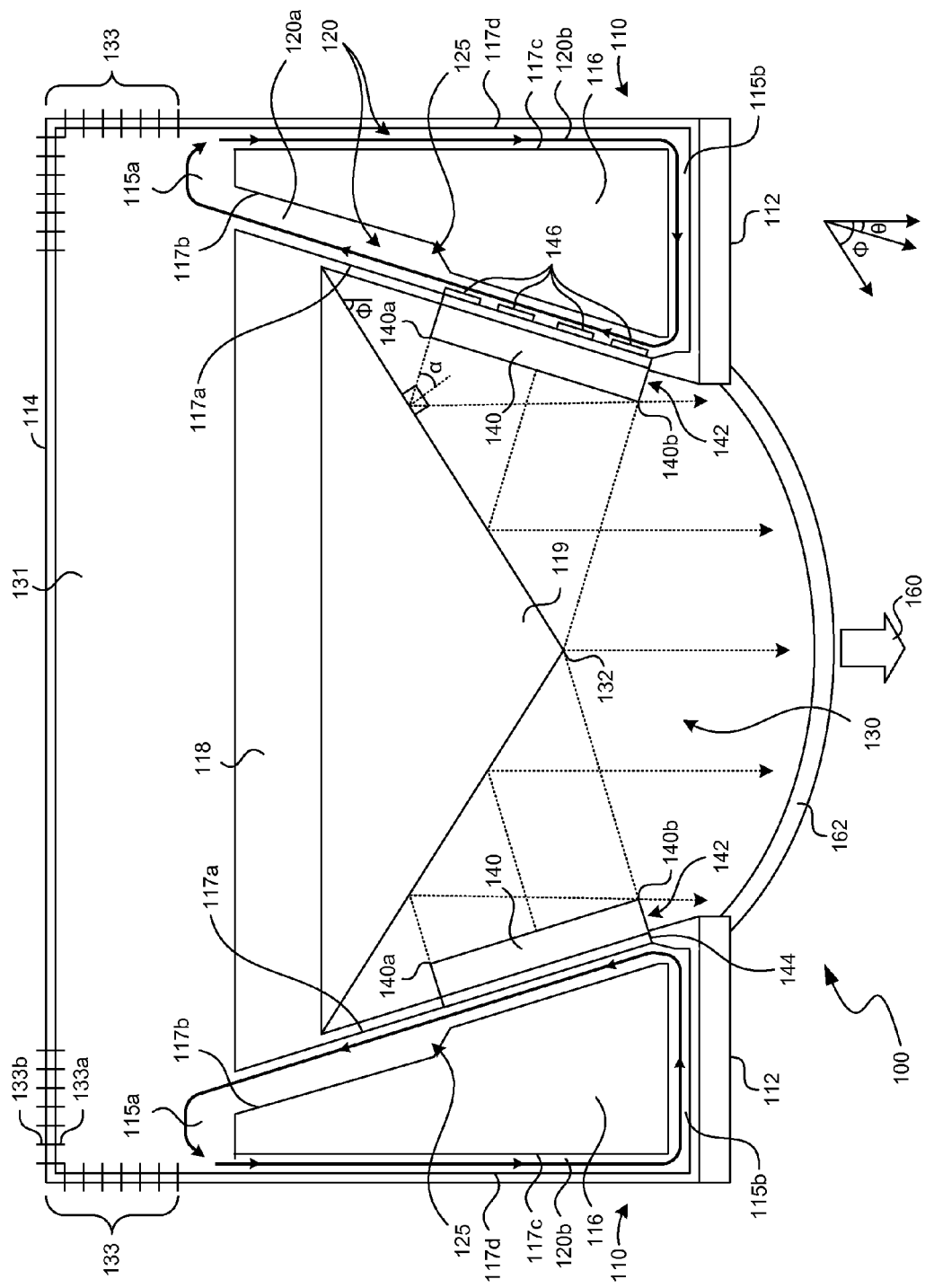
FIG. 2 is a partially schematic cross-sectional view of an SSL device in accordance with embodiments of the present technology.

FIG. 2 is a partially schematic side cross-sectional view of an SSL device 100 according to several embodiments of the present technology. The SSL device 100 can include a housing 110 having a front 112, a back 114, a side section 116 between the front 112 and the back 114, and a base 118 between the side section 116. The side section 116 can include an inner wall 117a, a first intermediate wall 117b, a second intermediate wall 117c, and an outer wall 117d that together define a closed recirculation system for a cooling fluid ("closed-system") channel loop 120. The closed-system channel loop 120 can include a first channel 120a between the inner wall 117a and the first intermediate wall 117b, and a second channel 120b between the second intermediate wall 117c and the outer wall 117d. The closed-system channel loop 120 can also include an upper return 115a in fluid communication with the first and second channels 120a, 120b near the base 118, and a lower return 115b in fluid communication with the first and second channel loops 120a, 120b near the front 112. An area between the base 118 and the back 114 can define a cooling headspace 131 or reservoir where heat can be transferred out of the fluid. The first and second channels 120a-b can both open into the headspace 131. In some embodiments, the upper return 115a comprises a tube portion between the first and second channels that is separate from the headspace 131. The headspace 131 and closed-system channel loop 120 can therefore contain different fluids in such an embodiment. In other embodiments, the closed-system channel loop 120 and the headspace 131 can be filled (or at least substantially filled) with a coolant fluid, such as a dielectric coolant fluid, that circulates through the closed-system channel loop 120 to transfer heat from the inner wall 117a to the fluid in the headspace 131. The back 114 can include a cooling structure 133, including internal fins 133a and/or external fins 133b to increase the thermal transport from the coolant fluid to the external environment. In each of these embodiments, the closed-system channel loop 120 and headspace 131 define an enclosure in which the coolant fluid is contained in and recirculated through an inner environment sealed (or at least substantially sealed) from the external or ambient environment. The housing 110 can include a valve or opening (not shown) through which the cooling fluid can be replenished or replaced if the cooling fluid becomes contaminated or deteriorated or if the SSL device 100 is to be used in a different application requiring a different cooling fluid.

The coolant fluid can have desirable thermal and other physical properties depending on the application of the SSL device 100. For example, the coolant fluid can change phase between the first channel 120a and the upper return 115a, and again as it falls through the second channel 120b to the lower return 115b. In some embodiments, the SSEs 140 can cause the coolant to change from a liquid to a gas state, and the cooling in the upper return 115a and the headspace 131 can cause the coolant to condense into a liquid before returning back through the second channel 120b. The energy required to cause the phase change from liquid to gas is provided by heat from the SSEs 140, and the heat sink of the cooling structure 133 can cause the phase change from gas to liquid.

The properties and quantity of coolant fluid and fluid circulation rate can be selected at least generally according to the amount of energy used by the SSEs 140 in a given configuration because different SSEs 140 and SSE configurations produce different heat loads. Other characteristics of the coolant fluid are independent of SSE energy configuration. For example, the fluid can be dielectric fluid to avoid shorting circuitry of the SSEs 140 and of the SSL device 100.

The housing 110 can also include a chamber 130 defined in part by the inner wall 117a of the side section 116 and the base 118. The chamber 130 can be separate from the closed-system channel loop 120. In other embodiments, described below, the closed-system channel loop 120 can pass through a portion of the chamber 130. The SSL device 100 can further include a reflector 119 mounted to the base 118 in the chamber 130, and a plurality of SSEs 140 mounted to the side section 116 to face the reflector 119. The SSEs 140 can have an active portion 142 that emits light toward the reflector 119 and a back portion 144 mounted to the side section 116. The reflector 119 directs the light from the SSEs 140 along a primary output direction 160. The SSL device 100 can also include a lens 162 over the chamber 130 in the optical path of the primary output direction 160. In some embodiments, the lens, 162, the back 114, and the side sections 116 can contain the coolant fluid. In other embodiments, the closed-system channel loop 120 can be separate from the chamber 130 such that the closed-system channel loop 120 can contain the cooling fluid while the chamber 130 contains another fluid, such as air, or is open to an external environment.

In several embodiments, at least a portion of the SSEs 140 is exposed to the closed-system channel loop 120. For example, the back portion 144 of the SSEs 140 can be exposed in the first channel 120a, which can be oriented at a sufficiently high angle relative to horizontal such that the coolant fluid in the first channel 120a is heated by the SSEs 140 and rises to create a circulating fluid current through the closed-system channel loop 120. This produces a passive, natural cooling flow of coolant fluid across a surface of the SSEs 140. The coolant fluid can be a material that expands or boils when heated at the operating temperatures of the SSEs 140, such that heat from the SSEs 140 causes low pressure in the coolant to induce the fluid to circulate through the closed-system channel loop 120.

In several embodiments, the SSEs 140 can be mounted generally parallel with the first channel 120a. In other embodiments, the SSEs 140 are not necessarily parallel with the first channel 120a, but can be mounted at a sufficient angle relative to horizontal such that warmed fluid in the first channel 120a rises and continues the cooling fluid flow through the closed-system channel loop 120.

In several embodiments, the back 114 and the cooling fins 133 are exposed to ambient air (or another relatively cool environment) that is sufficiently cooler than the SSEs 140 to maintain the temperature of the SSEs 140 within a desired operating range. The first channel 120a can have a first width near the front 112 and a second width near the base 118 to create advantageous fluid pressure in the first channel 120a. For example, the first width can be smaller than the second width to create a Joule-Thompson expansion zone 125 in the first channel 120a to further encourage the fluid to circulate through the closed-system channel loop 120.

In several embodiments the SSEs 140 can be positioned and angled relative to the reflector 119 such that the reflector 119 directs substantially all of the light out of the SSL device 100. For example, the SSEs 140 can emit light directed principally in one direction 160 normal to the surface of the active portions 142 of the SSEs 140. It is generally advantageous to output as much light as possible from the SSL device 100 and still have a compact design. As such, the SSEs 140 can be positioned relative to the reflector 119 such that the reflector 119 directs light from a first edge 140a of the SSEs 140 past a second edge 140b of the SSEs 140. Additionally, the SSEs 140 and reflector can be configured such that light from the second edge 140b of the SSEs 140 is directed at an apex 132 of the reflector 119 to prevent light from the second edge 140b of the SSEs 140 from missing the reflector 119 and striking an opposing SSE 140 (or other component). This arrangement outputs more light from the SSL device 100 and avoids accumulating additional heat in the SSL device 100 that would otherwise occur if light were reflected back into the SSL device 100. In some embodiments, the reflector 119 can be angled relative to the primary direction 160 by a first angle ($\Phi$). The front 142 of the SSEs 140 can be angled relative to the primary direction 160 by a second angle ($\Theta$) and the reflector 119 and the front 142 can be angled relative to one another by a third angle ($\alpha$). The first angle ($\Phi$) can be approximately equal to the second angle ($\Theta$) plus the third angle ($\alpha$).

Figure 3A:
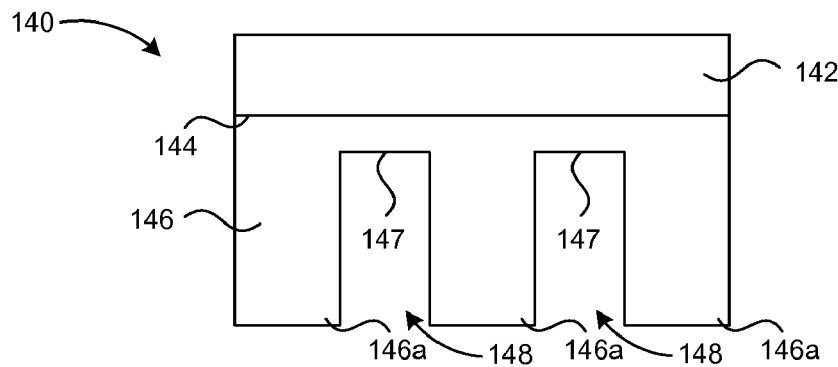
FIG. 3A is a partially schematic side view of an SSE having thermally conductive projections in accordance with embodiments of the present technology.
Figure 3B:
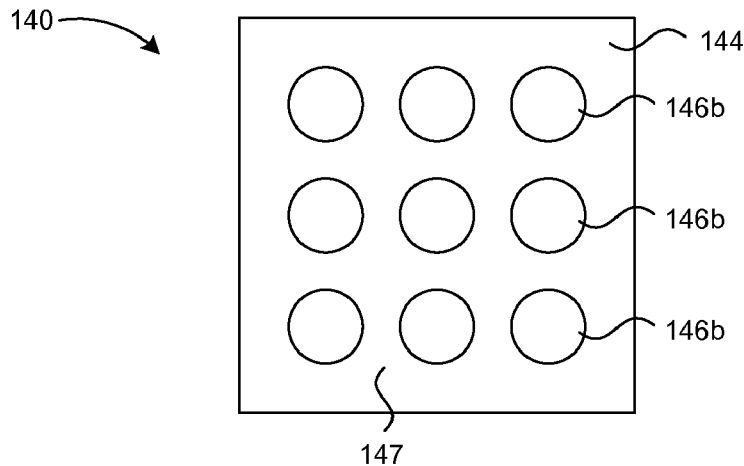
FIG. 3B is a partially schematic back view of an SSE having thermally conductive projections in accordance with embodiments of the present technology.
Figure 3C:
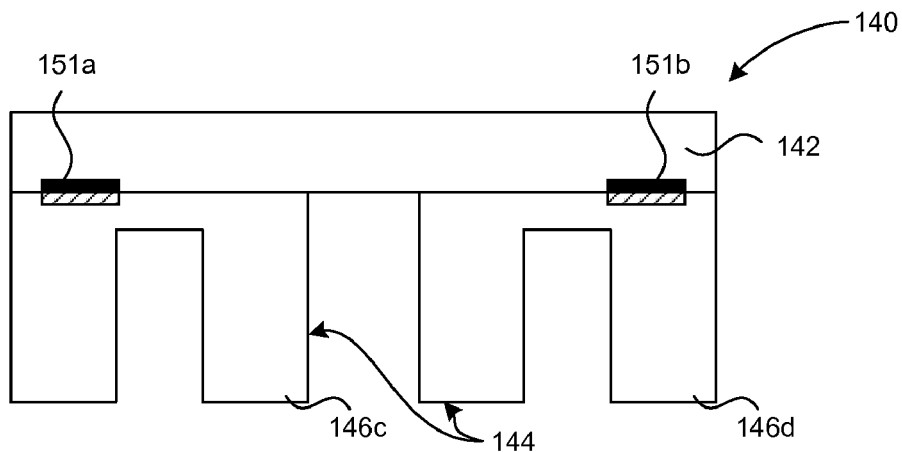
FIG. 3C is a partially schematic side view of an SSE having thermally conductive projections and electrical contacts in accordance with embodiments of the present technology.

The back portion 144 of the SSEs 140 can include a heat sink made of a thermally and/or electrically conductive material, such as copper (Cu), aluminum (Al), or a high-potassium (k) alloy. In several embodiments, the back portion 144 can include projections 146, such as fins, posts, or other features that increase the thermally conductive surface area of the back portion 144 that is exposed in the closed-system channel loop 120. FIGS. 3A-3C illustrate several configurations of the projections 146 according to embodiments of the present technology. FIG. 3A shows a cross-sectional view of an embodiment of a back portion 144 having a shallow section 147 covering the backside of the active portion 142 and several elongated, generally rectilinear projections 146a extending from the shallow section 147. Alternatively, back portion 144 does not need to have the shallow section 147 such that the individual projections 146a can be separated from one another with the backside of the active portion 142 exposed between the projections 146a. The projections 146a can define conduits 148 parallel to the fluid-flow through the first channel 120a (FIG. 2), or they can be angled or otherwise non-parallel with the fluid-flow in the first channel 120a according to known heat transfer techniques.

FIG. 3B is a view of another embodiment of the back portion 144 of the SSE 140 that includes projections 146b comprising a plurality of posts extending from the back portion 144 of the SSE 140. The projections 146b can be arranged in rows and columns, or they can be staggered in other arrangements. As with other embodiments, the projections 146b can project from a shallow section 147 integral with the projections 146b.

Other suitable heat-exchanging structures can be used with the SSE 140. For example, FIG. 3C illustrates another embodiment of the present technology in which the back portion 144 includes projections 146c and 146d made from an electrically conductive material. The active portion 142 of the SSE 140 can include electrical contacts 151a and 151b (e.g., n and p contacts) that are electrically coupled to the projection portions 146c and 146d, respectively. In other embodiments, the projections 146c and 146d can be made from a dielectric material or electrically isolated conductor material and include interconnects electrically connected to the electrical contacts 151a, 151b.

Figure 4A:
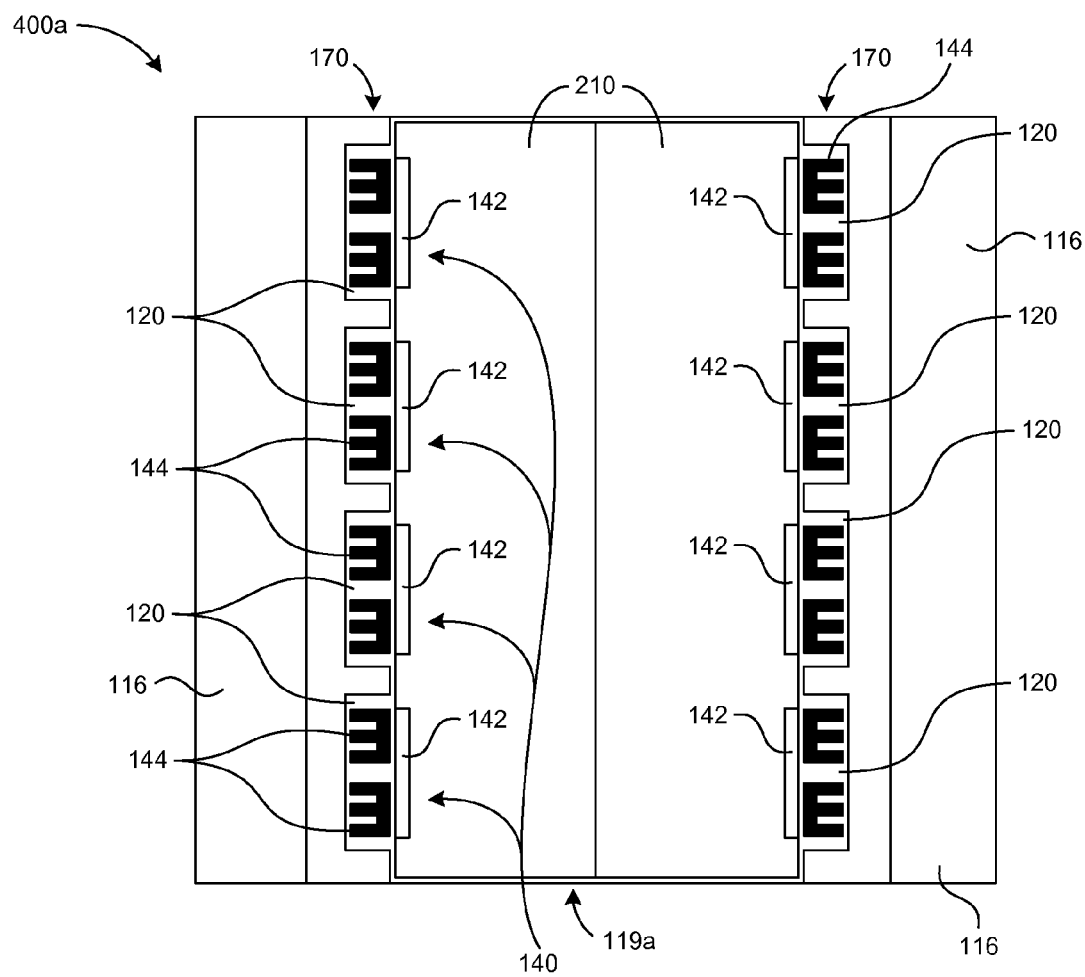
FIG. 4A is a partially schematic bottom plan view of a rectangular SSL device in accordance with other embodiments of the present technology.
Figure 4B:
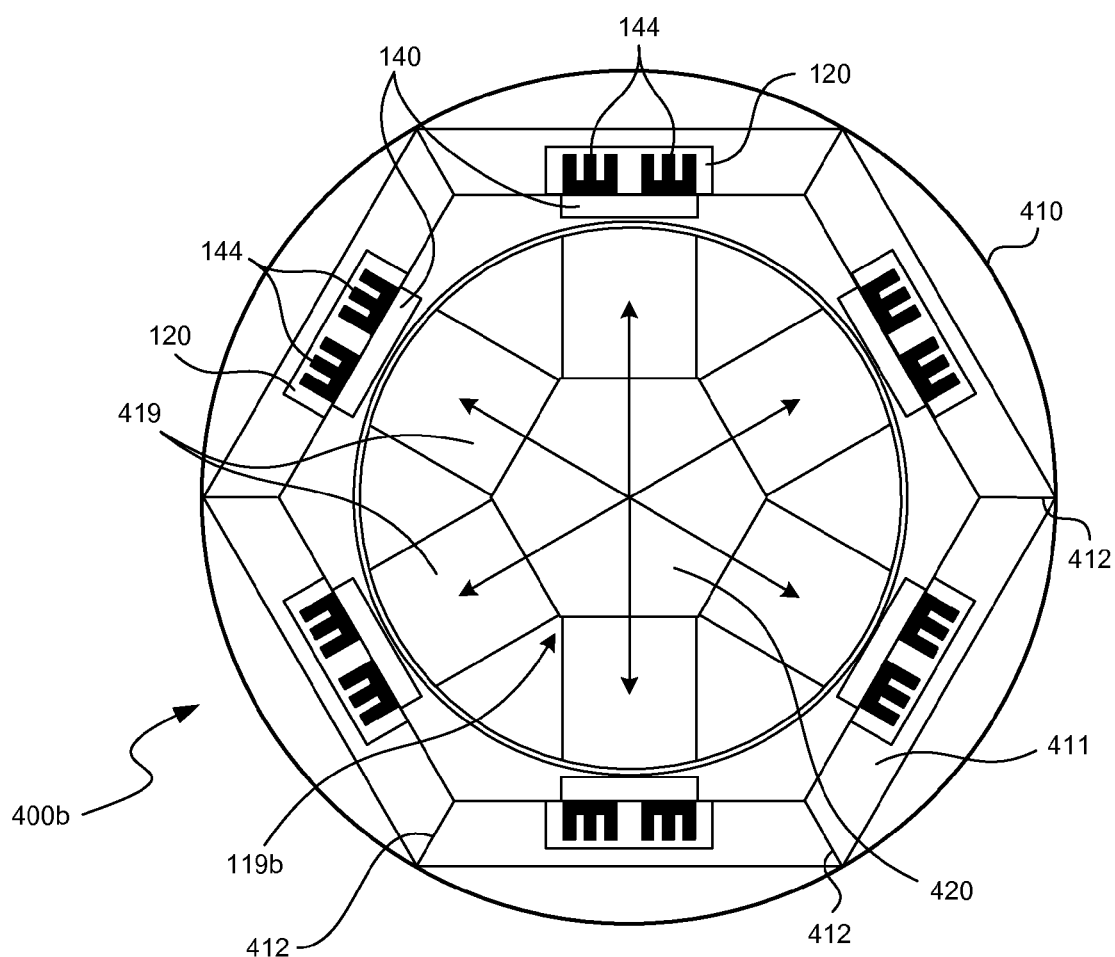
FIG. 4B is a partially schematic bottom plan view of a circular SSL device in accordance with other embodiments of the present technology.

FIGS. 4A and 4B are bottom plan views of specific embodiments of SSL devices 400a and 400b, respectively. More specifically, the SSL device 400a in FIG. 4A is generally rectilinear, and the SSL device 400b shown in FIG. 4B is hexagonal, polygonal, or circular. Like reference numbers generally refer to similar or even identical components in FIGS. 2, 4A and 4B.

Referring to FIG. 4A, the SSL device 400a includes an elongated reflector 119a composed of two generally flat, rectangular reflective surfaces 210. In this embodiment, the SSL device 400a has separate side sections 116, and each side section 116 has a plurality of channels, forming closed-system channel loops 120 as discussed above. The SSEs 140 can be arranged in rows 170 flanking each surface 210 of the reflector 119a such that the active portions 142 face the reflective surfaces 210 and the back portion 144 are in or otherwise exposed to the closed-system channel loops 120. The SSL device 400a can include any suitable number of SSEs 140 arranged in the rows 170.

Referring to FIG. 4B, the SSL device 400b has a rounded or circular housing 410 and a reflector 119b. The reflector 119b can be conical or faceted (e.g., pyramidal). The reflector 119b of the SSL device 400b shown in FIG. 4B, for example, is faceted and includes six facets 419 configured to reflect the light from six corresponding SSEs 140, each of which can have a thermally conductive back portion 144. In other embodiments, however, the SSL device 400b can include any suitable number of facets and SSEs 140. The reflector 119b can also be a truncated faceted structure with a flat top surface 420 defining the apex.

The SSL device 400b can also have a planar support 411 that has beveled edges 412. The angle of the beveled edges 412 can vary according to the number of sides. For example, a configuration with six sides has bevels of 60°. The beveled edges 412 of neighboring supports 411 can abut one another around the SSL device 400. The SSL device 400b can also have one or more SSEs 140 mounted to the planar supports 411. In one embodiment, the SSEs 140 can be mounted to the planar supports 411 using conventional planar mounting techniques and equipment while the supports 411 are flat and before the supports 411 are joined to the SSL device 100. As with other embodiments shown and described above, the SSL device 400b can include one or more closed-system channel loops 120 through which a coolant fluid can circulate to cool the SSEs 140.

Figure 5:
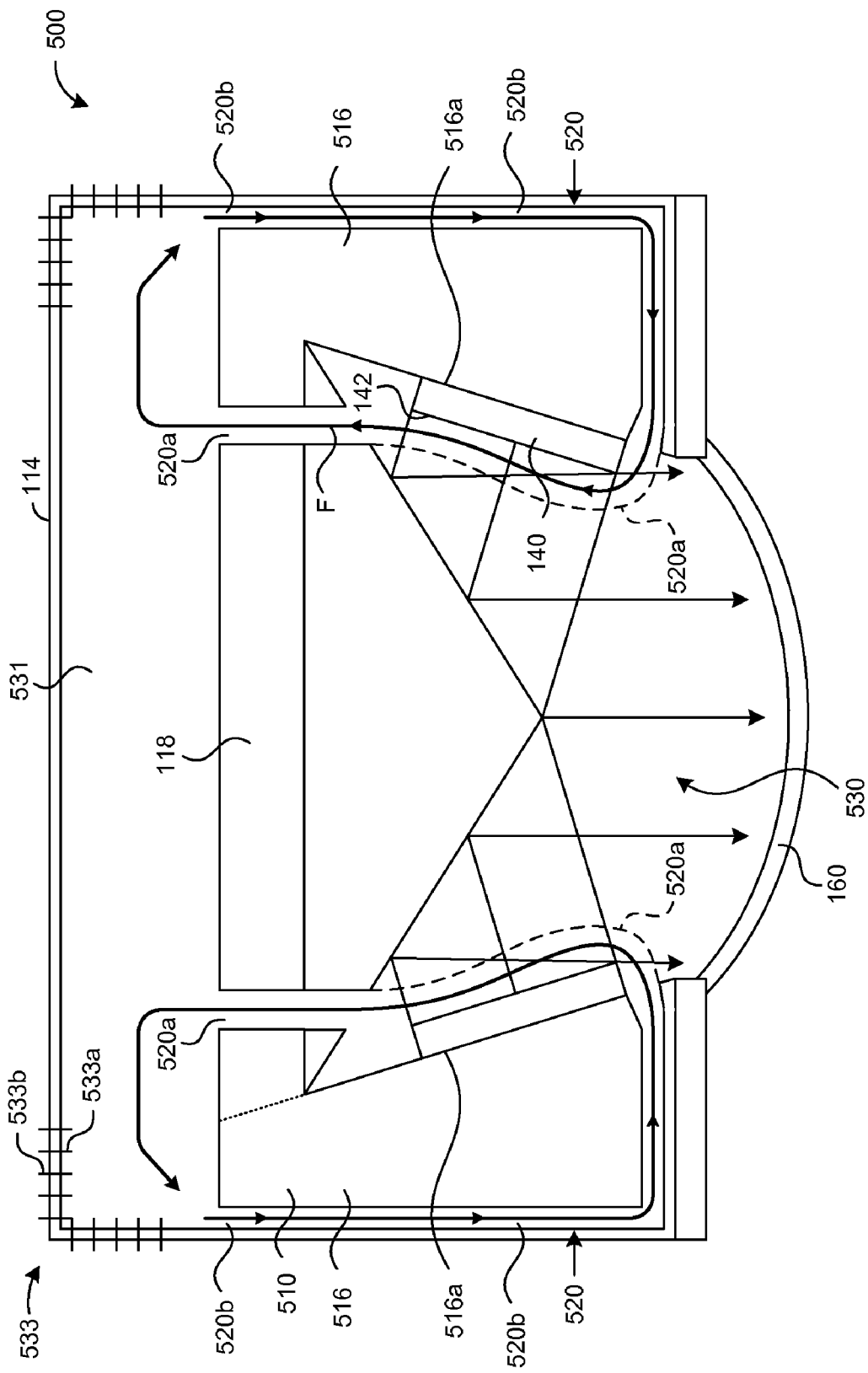
FIG. 5 is a partially schematic cross-sectional view of an SSL device in accordance with embodiments of the present technology.

FIG. 5 shows another SSL device 500 according to several embodiments of the present technology in which the active portions 142 of the SSEs 140 are mounted directly to an inner wall 516a of a housing 510. The side section 516, the base 118, and the lens 160 define a chamber 530 containing a transparent coolant fluid, and can be sufficiently sealed to contain the liquid coolant free from contaminants or leakage. As light from the SSEs 140 passes through the coolant, the coolant can contain particles of converter material suspended or blended within the coolant fluid to augment, alter, or replace the light-altering characteristics of a fixed converter material mounted on or near the SSEs 140. The housing 510 includes a closed-system channel loop 520 having an upward channel 520a and a downward channel 520b. A portion of the upward channel 520a is a "virtual channel" (shown in dotted lines) that extends through the chamber 530 along the inner wall 516a of the side section 516 and over the active portions 142 of the SSEs 140. The flow F eventually reaches a headspace 531 where it cools and, in some instances, condenses. The back 114 forms part of the enclosure of the head space 531 and can include cooling structures, such as fins 533, that can be internal fins 533a and/or external fins 533b. The downward channel 520b passes through the side section 516 downward from the headspace 531 and connects with the upward channel 520a below the SSE 140.

In operation, the SSE 140 produces heat which warms the coolant fluid in the upward channel 520a and causes the fluid to circulate through the closed-system channel loop 520. In this embodiment, the closed-system channel loop 520 and the chamber 530 are not separated, but define a single reservoir of coolant fluid. The SSEs 140 emit light toward the reflector 119 through the coolant fluid. Accordingly, in addition to having desired thermal and electrical properties, the coolant fluid can be transparent. The natural, passive flow of coolant fluid can carry heat from the SSEs 140 to the fins 533 and out of the SSL device 500. In some embodiments, no fluid moving or pressurizing equipment is required in the SSL device 500.

Figure 6:
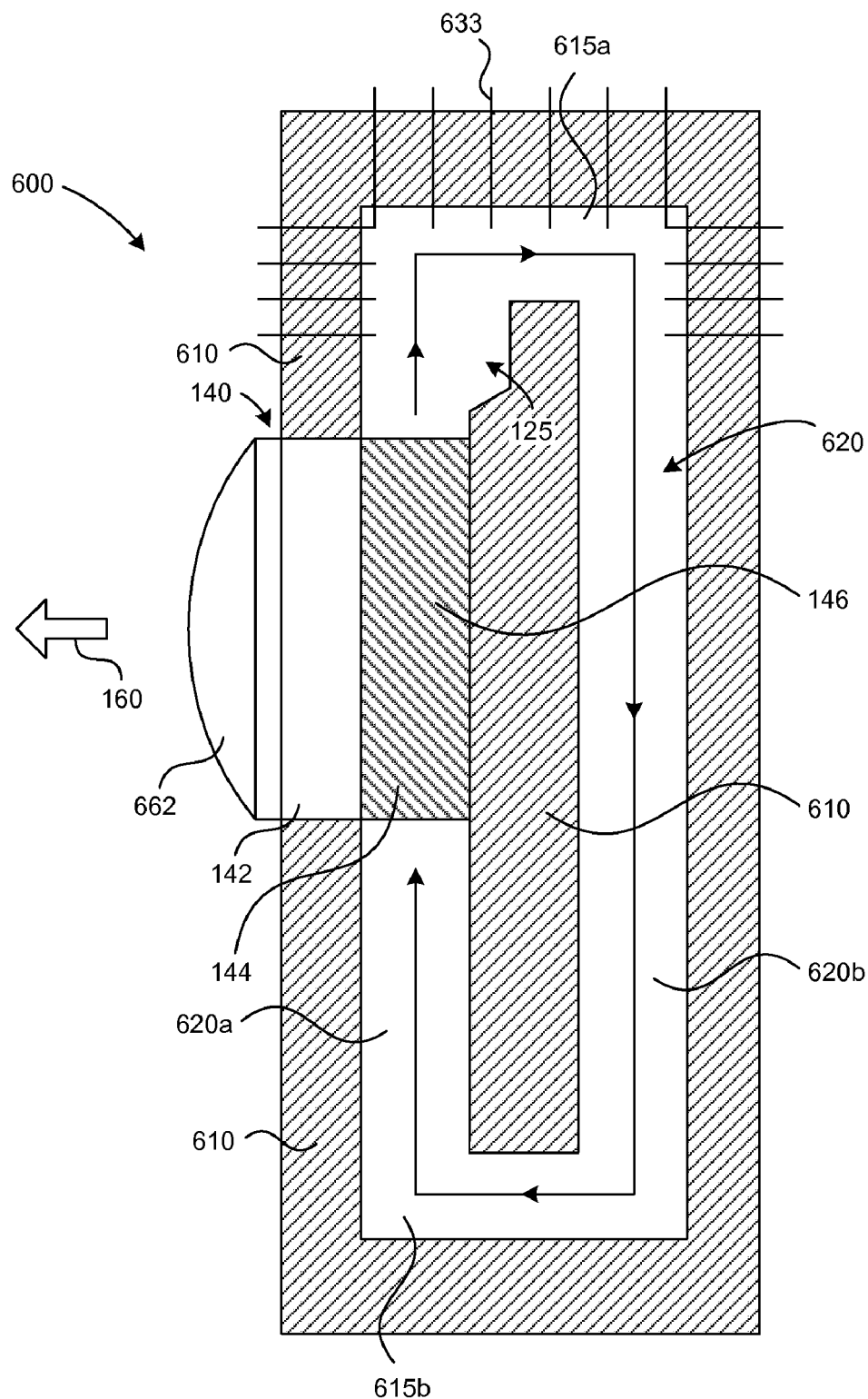
FIG. 6 is a partially schematic cross-sectional view of an SSL device in accordance with embodiments of the present technology.

FIG. 6 illustrates an SSL device 600 in accordance with still further embodiments of the present technology. The SSL device 600 can include an SSE 140 with an active portion 142 and a thermally conductive back portion 144 with projections 146, such as fins or posts, to increase the thermally conductive surface area. The SSE 140 can have a lens 662 aligned with the active portion 142. The SSE 140 can be mounted to a support 610. The SSL device 600 can be situated to emit light in a generally horizontal direction 160 with the support 610 extending generally vertically such as on a wall, in a computer monitor or television set, or in another generally vertical structure. The support 610 can include a closed-system channel loop 620 that contains a liquid coolant and comprises an upward channel 620a passing across the projections 146 and a downward channel 620b opposite the upward channel 620a. The upward channel 620a can be in fluid communication with the downward channel 620a by an upward return 615a above the SSE 140 and a downward return 615b below the SSE 140. The upper return 615a can be bounded by thermally conductive structures, such as fins 633 which may extend into the upper return 615a and/or out of the SSL device 600. Similar to the mechanism described above, heat from the projections 146 causes a natural, passive current in the coolant fluid that brings heat from the projections 146 to the fins 633 and out of the SSL device 600. In some embodiments, the closed-system channel loop 620 can include an expansion zone 125 above the projections 146 to further encourage fluid flow through the closed-system channel loop 620. The projections can be electrically connected to the SSE 140 and to an external contact in the support 610.

The lenses 162 and 662 of the embodiments described above in FIGS. 2-6 can be formed of injection molded silicone or other suitable material. The lenses 162 and 662 can include a converter material such as phosphor. When light from the SSEs 140 passes through the converter material, the converter material emits light of a desired color and quality. The converter material can be placed anywhere in an optical path of the SSEs 140, including on or in the lens 162 or another cover, or separate from a lens or cover. In some embodiments, the converter material can be suspended within a fluid through which light from the SSEs 140 passes. Alternatively, the converter material can be placed in a phosphor well. For example, in one embodiment, the converter material can include a phosphor containing cerium(III)-doped yttrium aluminum garnet (YAG) at a particular concentration for emitting a range of colors from green to yellow to red under photoluminescence. In other embodiments, the converter material can include neodymium-doped YAG, neodymium-chromium double-doped YAG, erbium-doped YAG, ytterbium-doped YAG, neodymium-cerium double-doped YAG, holmium-chromium-thulium triple-doped YAG, thulium-doped YAG, chromium(IV)-doped YAG, dysprosium-doped YAG, samarium-doped YAG, terbium-doped YAG, and/or other suitable phosphor compositions. The lenses 162 and 662 can simply transmit the light from the SSEs 140 and converter material or it can further focus or otherwise alter characteristics of the light.

From the foregoing, it will be appreciated that specific embodiments of the invention have been described herein for purposes of illustration, but well-known structures and functions have not been shown or described in detail to avoid unnecessarily obscuring the description of the embodiments of the invention. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list.

Also, it will be appreciated that specific embodiments described above are for purposes of illustration and that various modifications may be made without deviating from the invention. Aspects of the technology described in the context of particular embodiments may be combined or eliminated in other embodiments. For example, a pump can be replaced with other fluid circulating mechanisms. Further, while advantages (e.g., heat dissipation mechanisms) associated with certain embodiments of the technology may have been described in the context of those embodiments, other embodiments may also exhibit such advantages, and not all embodiments need necessarily exhibit such advantages to fall within the scope of the technology. Accordingly, the present technology and associated technology can encompass other embodiments not expressly shown or described herein.

We claim:

1. A solid state lighting device (SSL), comprising:
a housing having a chamber and a closed-system channel loop, the channel loop including a first channel and a second channel, wherein at least a portion of the first channel is inclined at an angle relative to horizontal, and wherein the channel loop includes a cooling structure between the first channel and the second channel;
a coolant fluid in the closed-system channel loop, wherein the cooling structure is configured to transfer heat from the coolant fluid; and
a solid state emitter (SSE) carried by the housing, the SSE having an active portion from which light is emitted and a back portion, the active portion facing toward the chamber, and one of the active portion and the back portion directly contacting the coolant fluid in the first channel.

2. The SSL device of claim 1 wherein the coolant fluid comprises a dielectric fluid that expands when heated such that the dielectric fluid in the first channel rises and the dielectric fluid circulates from the first channel to the cooling structure.

3. The SSL device of claim 1, wherein:
the housing has a base and a side section along at least a portion of the base that together define the chamber;
the side section further comprises an inner wall and a first intermediate wall that together define the first channel;
the side section further comprises an outer wall and a second intermediate wall that together define the second channel;
the first channel and second channel are in fluid communication with each other and thereby form a recirculating fluid current loop having a hot portion in the first channel and a cold portion in the second channel;
the cooling structure is between the hot portion and the cold portion;
the SSE is attached to the side section such that the active portion is exposed to the channel;
the coolant comprises a transparent coolant;
the SSL device further comprises a reflector in the chamber that has a reflective surface the directs light from the active portion of the SSE along a primary light direction; and
the SSL device further comprises a lens over the chamber; and
the chamber, the lens, the cooling structure, and the side section form an enclosure that contains the coolant within the SSL device.

4. The SSL device of claim 1 wherein heat from the SSEs is sufficient to cause a first phase change in the coolant and the cooling structure is configured to cause a second phase change in the coolant.

5. The SSL device of claim 1 wherein the cooling structure includes at least one of internal fins contacting the coolant and external fins exposed outside the SSL device.

6. The SSL device of claim 1 wherein the coolant comprises liquid coolant.

7. The SSL device of claim 1, wherein:
the housing has a base and a side section along at least a portion of the base that together define the chamber;
the side section further comprises an inner wall and a first intermediate wall that together define the first channel;
the side section further comprises an outer wall and a second intermediate wall that together define the second channel;
the first channel and second channel are in fluid communication with each other and thereby form a fluid current loop having a hot portion in the first channel and a cold portion in the second channel;
the SSE is attached to the side section such that the back portion is exposed to the first channel;
the back portion of the SSE comprises a plurality of projections in the first channel;
the chamber is separated from the first and second channels by the inner wall;
the SSL device further comprises a reflector in the chamber that has a reflective surface the directs light from the active portion of the SSE along a primary light direction; and
the first channel, the second channel, and the cooling structure form an enclosure containing the coolant.

8. The SSL device of claim 7, wherein the back portion further comprises a first electrically conductive projection and a second electrically conductive projection extending from the active portion of the SSE.

9. The SSL device of claim 7 wherein the first channel has an inlet and an outlet, the first channel having a first width near the inlet and a second width near the outlet, and wherein the first width is smaller than the second width.

10. The SSL device of claim 7 wherein the chamber is open to an external environment.

11. The SSL device of claim 1, further comprising an access port through which the coolant fluid can be added or changed.

12. A solid state lighting device (SSL), comprising:
a housing having a channel loop configured to recirculate a fluid within the SSL device, the channel loop including—
an upward channel having an upward inlet and an upward outlet,
a downward channel having a downward inlet and a downward outlet,
an upward return between the upward outlet and the downward inlet, and
a downward return between the downward outlet and the upward inlet;
a dielectric coolant fluid in the channel loop;
a cooling structure in the upward return; and
a solid state emitter (SSE) carried by the housing with at least a portion of the SSE in the upward channel, the upward channel being oriented such that the dielectric coolant fluid in the upward channel directly contacts and is heated by the SSE and rises such that a fluid current is induced in the channel loop upward through the upward channel and downward through the downward channel to cool the portion of the SSE.

13. The SSL device of claim 12 wherein the SSE includes a back portion having a plurality of thermally conductive projections extending into the upward channel.

14. The SSL device of claim 12 wherein the cooling structure comprises at least one of internal cooling fins contacting the coolant in the upward return and external cooling fins exposed outside the SSL device.

15. The SSL device of claim 12, further comprising a reflector in an optical path of the SSE, wherein light from the SSE is reflected from the reflector and out of the SSL device.

16. The SSL device of claim 12 wherein the SSE has a light-emitting active portion, and wherein the light-emitting active portion is exposed in the upward channel.

17. The SSL device of claim 16 wherein the coolant fluid comprises a transparent fluid.

18. The SSL device of claim 16 wherein the coolant fluid contains a converter material blended with the coolant fluid.

19. The SSL device of claim 12, the housing further comprising a chamber separate from the channel loop.

20. The SSL device of claim 12 wherein the upward channel includes a Joule-Thompson expansion having a first width in the upward channel near the upward inlet and a second width, larger than the first width, in the upward channel near the upward outlet.

21. The SSL device of claim 12 wherein—
the SSL device further comprises a reflective cone in an optical path of the SSEs and configured to direct light from the SSEs in a primary lighting direction;
a surface of the reflective base is angled relative to the primary lighting direction by a first angle, phi;
a lighting surface of the SSE is angled relative to the primary lighting direction by a second angle, theta;
the surface of the reflective base and the lighting surface are angled relative to one another by a third angle, alpha; and
the first angle, phi, is at least approximately equal to the third angle, alpha, plus the second angle, theta.

22. The SSL device of claim 12 wherein the SSE is oriented to emit light generally horizontally, and wherein the upward and downward channels are oriented generally vertically.

23. The SSL device of claim 12 wherein the SSE comprises a plurality of thermally and electrically conductive projections exposed to the upward channel, wherein the projections comprise a first electrical contact and a second electrical contact, wherein the first and second electrical contacts are electrically isolated from one another, and wherein the first electrical contact is connected to an N contact on the SSE and the second electrical contact is connected to a P contact on the SSE.

24. A method of manufacturing a solid state lighting (SSL) device, comprising:
forming a support with a recirculating closed-system channel loop through the support;
flowing a coolant fluid into the closed-system channel loop and sealing the coolant fluid in the closed-system channel loop; and
attaching a solid state emitter (SSE) to the support such that at least a portion of the SSE directly contacts coolant fluid in a first portion of the recirculating closed-system channel loop, wherein the first portion of the closed-system channel loop is oriented generally vertically.

25. The method of claim 24, further comprising positioning a reflective surface in an optical path of the SSE, wherein the reflective surface is oriented relative to the SSEs to receive light emitted from the SSE and to reflect the light out of the SSL device through at least a portion of the coolant fluid and through the lens.

26. The method of claim 24, further comprising:
operating the SSE such that heat is produced by the SSE and transferred to the coolant fluid; and
passively circulating the coolant fluid through the recirculating closed-system channel loop using the heat produced by the SSE.

27. The method of claim 24 wherein forming the support comprises forming an enclosed chamber in fluid communication with the recirculating closed-system channel loop.

28. The method of claim 24 wherein forming the support comprises forming a chamber separate from the closed-system channel loop.

29. The method of claim 28 wherein the chamber is filled with a material different than the liquid coolant.

30. The method of claim 24, further comprising forming at least one fin that directly contacts the coolant fluid to transfer heat from the coolant fluid.

31. The SSL device of claim 1 wherein the cooling structure includes at least one fin that directly contacts the coolant fluid located in the housing.

32. A solid state lighting device (SSL), comprising:
   a housing having a fluid chamber, the fluid chamber including a channel loop having a plurality of channels; coolant fluid in the fluid chamber;
   a cooling structure configured to transfer thermal energy from the coolant fluid, the cooling structure including at least one heat transfer fin that directly contacts the coolant fluid in the fluid chamber; and
   a solid state emitter (SSE) coupled to the housing, the SSE including an active portion from which light is emitted and a back portion, and at least one of the active portion and the back portion directly contacting the cooling fluid.

33. The SSL device of claim 32 wherein at least one of the active portion and the back portion directly contacts the coolant fluid in one of the channels.

34. The SSL device of claim 32 wherein the coolant fluid comprises a dielectric fluid.

* * * * *

UNITED STATES PATENT AND TRADEMARK OFFICE
CERTIFICATE OF CORRECTION

PATENT NO.         : 8,217,557 B2
APPLICATION NO.    : 12/872647
DATED              : July 10, 2012
INVENTOR(S)        : Scott E. Sills et al.

It is certified that error appears in the above-identified patent and that said Letters Patent is hereby corrected as shown below:

In column 9, lines 41-42, in Claim 12, delete "including–" and insert -- including: --, therefor.

In column 10, line 19, in Claim 21, delete "wherein–" and insert -- wherein: --, therefor.

Signed and Sealed this
Twenty-eighth Day of August, 2012

David J. Kappos
*Director of the United States Patent and Trademark Office*